United States Patent [19]

Ojebuoboh et al.

[11] Patent Number: 5,234,492
[45] Date of Patent: Aug. 10, 1993

[54] REFINING OF BISMUTH

[75] Inventors: Funsho K. Ojebuoboh, Midvale, Utah; Stephen A. Blaskovich, Papillion, Nebr.

[73] Assignee: ASARCO Incorporated, New York, N.Y.

[21] Appl. No.: 868,388

[22] Filed: Apr. 14, 1992

[51] Int. Cl.$^5$ ............................................. C22B 30/06
[52] U.S. Cl. .................................................... 75/705
[58] Field of Search ................... 75/705, 702; 423/87, 423/617

[56] References Cited

U.S. PATENT DOCUMENTS 4,039,323  8/1977  DiMartini et al. .................... 75/705

Primary Examiner—Melvyn J. Andrews
Attorney, Agent, or Firm—John J. Tomaszewski; Kenneth A. Koch

[57] ABSTRACT

An improved process for deleading debismuthized dross is provided wherein the upgraded dross is treated by cupellation to form a slag until the level of bismuth in the upgraded dross reaches about 45% by weight. After cupellation, the partially deleaded upgraded dross may be treated by conventional means such as halogenation to provide a substantially pure bismuth product.

6 Claims, No Drawings

REFINING OF BISMUTH

BACKGROUND OF THE INVENTION

This invention relates to the refining of bismuth and, more particularly, to an improved process for producing substantially pure bismuth from the debismuthizing dross obtained in the lead refining process.

The smelting of lead ores provides a bullion containing a number of "impurities" which are removed in various well-known refining steps to produce commercially pure lead. In general, the bullion is first decopperized, followed by a softening operation to remove elements such as tin, antimony and arsenic. The softened lead is then desilverized resulting in a desilverized bullion containing substantially lead and bismuth.

It is known in the prior art to remove the bismuth from the lead by treating a molten bath of lead-containing bismuth with appropriate alkaline earth or alkali metal as debismuthizing reagents. The bismuth forms an alkaline bismuthide (e.g., Ca $Mg_2Bi_2$) with the debismuthizing reagents and the alkaline bismuthide forms a dross on the molten lead bath surface, the dross being referred to in the art as alkaline bismuthide dross or debismuthizing dross. Calcium and magnesium are presently utilized as debismuthizing reagents for removing the bismuth from the lead. Sodium and potassium have also been utilized as the debismuthizing reagent. The dross is then separated from the lead, for instance by skimming. The debismuthizing process is described in U.S. Pat. No. 5,041,160, which patent is hereby incorporated by reference.

Unfortunately, the debismuthized dross contains mostly lead and both the lead and bismuth must be recovered from the dross for environmental and economic considerations. A typical dross contains, by weight, about 3 to 6% bismuth, 0.4 to 1.5% calcium and 1 to 2% magnesium, with the balance being essentially lead.

The separation and recovery of the bismuth from the lead is basically achieved by a series of steps which remove lead as a slag and increases the bismuth content of the remaining dross material until substantially pure bismuth is obtained.

One procedure to recover bismuth from debismuthizing dross is shown in U.S. Pat. No. 4,039,322 whereby solid alkaline debismuthide is physically separated from molten lead by vacuum filtration. This process increases the bismuthide concentration of the dross and reduces the amount of lead that must be removed in the remaining refining steps.

A commercial process for treating dross is to first remove the calcium and magnesium (usually termed upgraded dross) and then to halogenate the upgraded dross forming a PbCl2 slag. This is continued until substantially pure bismuth is obtained. The PbCl2 slag is generally recycled to treat the dross before halogenation to remove calcium and magnesium, which slag is used to treat the debismuthized lead obtained in the dedrossing step.

A process for refining debismuthizing dross is shown in U.S. Pat. No. 2,955,931 (Flores et al.), which patent is hereby incorporated by reference. In general, the basic process upgrades and smelts the dross according to known procedures to yield a product containing about 25-40% by weight bismuth, with the calcium and magnesium being removed in the form of slags. The product is then cupelled to increase the dross to the range of about 50-65% by weight bismuth. Above this level the dross is halogenated using chlorine gas to remove the remaining lead as lead chloride and leaving a relatively pure bismuth product.

In the improved process of Flores et al. the halogenation rate is increased by performing the halogenation in a bath wherein the bismuth content is maintained over 85%. This is accomplished by using a pool of high bismuth content lead alloy and adding the lower level bismuth dross (50-65%) in an amount and rate to maintain the bismuth content of the total bath above 85% during the halogenation reaction.

While the above processes for refining bismuth produce a high purity bismuth product, there is still a need for increasing the rate of recovery and/or yield of the bismuth product from the original feed material by accelerating the separation reaction and/or minimizing the amount of bismuth carried over in the slagging steps.

Accordingly, an object of the present invention is to provide an improved bismuth refining process which provides increased bismuth recoveries and rates of recovery.

A further object is to provide an improved bismuth recovery process in the lead refining process wherein debismuthized dross is treated to recover bismuth therefrom.

Other objects and advantages will be apparent from the following description.

SUMMARY OF THE INVENTION

It has been discovered that the recovery and rate of recovery of bismuth from bismuth containing materials, e.g., debismuthized dross from the lead refining process, may be increased by utilizing a special cupellation procedure wherein the material is cupelled until the bismuth level of the material reaches an amount up to about 45% by weight. Above this level, the amount of bismuth reporting to the slag increases significantly thus reducing the final recovery of the bismuth product.

DETAILED DESCRIPTION OF THE INVENTION

While any suitable bismuth containing material may be treated according to the invention, the process will be described for convenience for debismuthized dross obtained from a lead refining process.

It is preferable to first remove calcium and magnesium from the dross and this may be accomplished using known techniques such as passing oxygen and/or air through the dross, caustic addition to the dross, or the recycling of lead chloride to the dross. All processes form a slag/dross containing most of the calcium and magnesium with some entrained bismuth and lead.

The resulting (upgraded) dross feed material is about, by weight, 4 to 15% bismuth or higher and usually about 5 to 10% bismuth, the balance essentially lead, and is charged to any suitable vessel where air or oxygen enriched air can be reacted with the upgraded dross. At this point, air or oxygen enriched air is added to the charge to form a lead oxide slag which is removed at desired intervals by tapping, skimming, etc. The temperature is maintained during this process preferably at a temperature needed to maintain a molten slag and is about 890° to 1000° C. or higher, preferably 890° to 960° C. and the cupellation is continued until the bismuth level of the upgraded dross reaches, by weight, about 45%, preferably 40%, and most preferably 30%. A molten slag may be defined as a slag which may be removed by skimming, tapping or tilting the furnace whereby the slag flows out of the furnace. It has been found that the bismuth loss to the slag rises slowly as the bismuth level of the upgraded dross being treated rises with a dramatic increase above about 45%, by weight.

The oxygen enriched air may contain oxygen up to about 50% by volume, preferably 40-45% and may be preheated or employed at ambient temperature.

Subsequent to the aeration of the upgraded dross to the desired bismuth level, the upgraded dross may then be halogenated to the final bismuth product concentration using conventional procedures, e.g., bubbling chlorine gas through the upgraded dross and skimming off the lead chloride slag.

It is an important feature of the invention that the slag be skimmed continuously, or at least intermittently, during the cupellation process to minimize bismuth losses in the slag. Deslagging at between 30 to 90 minute intervals, e.g., 60 minutes, during the cupellation process has been found to be effective to minimize bismuth losses.

For some applications, it is another important feature of the invention for minimizing bismuth losses to cupel the upgraded dross until a bismuth level above which the halogenation reaction will not produce sufficient recycle lead chloride to remove the calcium and magnesium from the debismuthized dross. Usually, the bismuth level will be about 15-25%, e.g., 20%, by weight. Following this procedure, lead chloride produced during the subsequent halogenation reaction can be used to upgrade the dross by removing the calcium and magnesium. Lead chloride may also be recycled for this purpose if deleading is performed up to 30% or more bismuth but it will probably be necessary to supplement the lead chloride treatment with caustic or air to remove the calcium and magnesium to the desired levels.

The following examples further illustrate the invention. All percentages are by weight and temperatures as ° C. unless specified otherwise.

All the examples employed a Cupel furnace approximately 8 feet in diameter and 6 feet high. The furnace is heated with two burners set in place at the rear of the furnace. Two blowpipes, also in the rear of the furnace, are used for bath agitation by air. The air and/or air-oxygen mixture was delivered to the furnace by two lances whose tips were immersed into the molten charge from ports at the top of the furnace. Skimming of the slag was achieved by tilting the furnace until metal could be identified in the skims.

EXAMPLE 1

An initial charge of 7.5 tons of upgraded dross (8.9% bismuth and no significant calcium or magnesium) was added to the furnace and heated to 900° C. Air enriched oxygen (42% oxygen by volume) was passed through the charge at a flow rate of about 1200 standard ft³/hour at a pressure of 30 psig from ½ inch O. D. Schedule 40 pipe. When the bismuth level of the upgraded dross reached about 20%, a new charge of 1 ton of upgraded dross (25% bismuth) was added. The resulting melt was deleaded to a level of about 30% bismuth. New upgraded dross of 8.9 % bismuth was repeatedly charged whenever the melt composition reached about 30%. After the final charge, which lowered the bismuth level to about 19.2%, deleading was continued beyond the 30% bismuth level. Aeration of the upgraded dross was continually performed during the treatment process. Skimming of the charge was performed at about 1 hour intervals by titling the furnace until metal was identified in the skims. The results are shown in Table 1.

TABLE 1

| Time (HRS) | Melt Temperature (°C.) | % Bismuth | |
|---|---|---|---|
| | | Bath | Slag |
| 0 | 849 | 19.2 | 1.96 |
| 2.3 | 962 | — | 2.54 |
| 3 | — | — | 2.85 |
| 5.8 | 950 | 27 | 3.48 |
| 9.8 | 899 | 30 | — |
| 10.5 | 936 | 43 | 5.07 |
| 15.5 | — | 50.3 | 13.0 |
| 17.6 | — | 64.7 | 26.0 |
| 18.3 | — | 65.0 | 31.0 |

As can be seen from Table 1, the amount of bismuth reporting to the slag increases dramatically when the bismuth level of the bath is above about 43%. Additionally, it was found that the time required to delead the upgraded dross was significantly less than the time required using the conventional halogenation procedure, supra.

It will be apparent that many changes and modifications of the several features described herein may be made without departing from the spirit and scope of the invention. It is therefore apparent that the foregoing description is by way of illustration of the invention rather than limitation of the invention.

We claim:

1. In a process for deleading debismuthized dross containing generally, by weight, about 3 to 6% bismuth, 0.4 to 1.5% calcium and 1 to 2% magnesium, with the balance being essentially lead wherein the dross is first treated to remove the calcium and magnesium forming an upgraded dross containing about, by weight, 4 to 15% bismuth, the balance essentially lead and then the upgraded dross cupelled to form a resulting cupelled dross and a slag which is skimmed from the resulting cupelled dross, leaving the cupelled dross with a higher bismuth level, the improvement comprising performing the cupellation step until the bismuth level of the resulting cupelled dross reaches an amount up to about 45% by weight.

2. The process of claim 1 including the improvement wherein the cupellation step is performed until the bismuth level of the resulting cupelled dross reaches an amount up to about 30%.

3. The process of claim 1 including the improvement wherein the slag generated by the cupellation reaction is skimmed continuously during the reaction.

4. The process of claim 3 including the improvement wherein the skimming is performed intermittently at about 30 to 90 minute intervals during the reaction.

5. The process of claim 2 including the improvement wherein the cupellation step is performed until the bismuth level of the resulting cupelled dross reaches an amount of about 15 to 25%.

6. The process of claim 5 including the improvement wherein the cupelled upgraded dross is halogenated to remove lead as lead chloride and the lead chloride is recycled to remove calcium and magnesium from the debismuthized dross and/or the debismuthized lead.

* * * * *